(12) United States Patent
Falcon et al.

(10) Patent No.: US 6,971,015 B1
(45) Date of Patent: Nov. 29, 2005

(54) METHODS AND ARRANGEMENTS FOR LIMITING ACCESS TO COMPUTER CONTROLLED FUNCTIONS AND DEVICES

(75) Inventors: Stephen Russell Falcon, Woodinville, WA (US); Clement Chun Pong Yip, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/538,621

(22) Filed: Mar. 29, 2000

(51) Int. Cl.[7] .............................................. H04K 1/00
(52) U.S. Cl. ...................... 713/182; 713/156; 713/168; 701/36
(58) Field of Search .............................. 713/201, 200, 713/202, 182, 168, 156; 707/9, 10, 201, 3; 700/83, 17; 710/11, 30; 709/224, 226, 228, 709/212, 217, 223, 247, 318, 322, 320, 229, 709/227; 701/1, 29, 32, 36, 93, 97, 98, 3, 701/49, 41

(56) References Cited

U.S. PATENT DOCUMENTS

| | | | | |
|---|---|---|---|---|
| 5,513,107 A | * | 4/1996 | Gormley ...................... | 701/48 |
| 5,734,569 A | * | 3/1998 | Rogers et al. ................. | 701/33 |
| 5,907,324 A | * | 5/1999 | Larson et al. ................ | 715/753 |
| 5,964,843 A | * | 10/1999 | Eisler et al. ................. | 719/323 |
| 6,052,632 A | * | 4/2000 | Iihoshi et al. ................. | 701/36 |
| 6,236,909 B1 | * | 5/2001 | Colson et al. ................. | 701/1 |
| 6,243,707 B1 | * | 6/2001 | Humpleman et al. ....... | 707/102 |
| 6,249,727 B1 | * | 6/2001 | Muller ......................... | 701/36 |
| 6,256,576 B1 | * | 7/2001 | Wild et al. ................... | 701/105 |
| 6,263,262 B1 | * | 7/2001 | Bitzer et al. .................... | 701/1 |
| 6,341,252 B1 | * | 1/2002 | Foo et al. ..................... | 701/45 |
| 6,466,971 B1 | * | 10/2002 | Humpleman et al. ....... | 709/220 |
| 6,487,717 B1 | * | 11/2002 | Brunemann et al. ........ | 717/173 |
| 6,516,256 B1 | * | 2/2003 | Hartmann et al. ............ | 701/35 |

\* cited by examiner

*Primary Examiner*—Gregory Morse
*Assistant Examiner*—Tongoc Tran
(74) *Attorney, Agent, or Firm*—Lee & Hayes, PLLC (57) ABSTRACT

Methods and arrangements are provided verify if a requesting computer application is authorized to change a controlled parameter associated with a computer controlled device and/or function. To accomplish this, one or verification functions are employed to analyze a security code or absence thereof, as identified by a requesting application. If the security code, which may be encrypted, matches a known or calculated valid security code, then the requesting application is deemed to be authorized to change the controlled parameter and/or modify certain limitations associated with an acceptable range for the controlled parameter. If the security code does not match a known or calculated valid security code, then the requesting application is deemed to be unauthorized to change the controlled parameter outside of a previously established acceptable range for the controlled parameter. The verification function can be implemented in a ROM to increase the security and to thwart attempts to circumvent the authorization scheme. Several independent verification functions can be arranged to support the verification of a plurality of authorized applications.

20 Claims, 9 Drawing Sheets

METHODS AND ARRANGEMENTS FOR LIMITING ACCESS TO COMPUTER CONTROLLED FUNCTIONS AND DEVICES

TECHNICAL FIELD

This invention relates to trusted computing, and more particularly, to methods and arrangements that limit access to computer controlled functions and/or devices.

BACKGROUND OF THE INVENTION

As more functions and devices are being controlled by computer systems and over computer networks, there is a potential for unauthorized users/applications to attempt to control these functions and devices. For example, as homes or automobiles become more computerized it may be possible for unauthorized computer applications to access and change certain operational parameters associated with various devices that are computer controlled. While actions of the unauthorized computer application may be completely unintentional, the results can be serious.

One example can be found in controlling the volume of an audio system within a vehicle. Here, the computer applications are arranged to set and maintain the volume level of the audio system or a select portion thereof. If an unauthorized computer application unintentionally, or worse intentionally, attempts to change the volume level the occupants and more particularly the driver may become irritated. For example, certain high quality "auto PCs" output well over 100 Watts of sound. If the volume level were to unexpectedly change from a low or moderate level to a high or maximum level, the occupants will not be amused.

Other examples include controlling devices or appliances in a home or business. Here, various computer applications can communicate controlling information to the devices/appliances. Consequently, an unintended situation might arise it an unauthorized computer application attempts to control the device/appliance.

Thus, there is a need for methods and arrangements for controlling access to computer controlled functions and devices. Preferably, the methods and arrangements will significantly reduce the possibility of unauthorized computer applications from unintentionally or intentionally changing the operation of the functions/devices, without overly burdening the user or the underlying computer systems and networks. Furthermore, it would be desirable for the methods and arrangements to be secure and modular in design to allow for wide dissemination without compromising certain security features.

SUMMARY OF THE INVENTION

The present invention provides methods and arrangements for controlling access to computer controlled functions and devices. The various methods and arrangements significantly reduce the possibility of unauthorized computer applications from changing the operation of the functions/devices by employing a security code authorization scheme that identifies trusted computer applications. The methods and arrangements can be implemented in a secure and/or modular fashion that promotes wide dissemination without compromising certain security features and without overly burdening existing computer systems and networks.

Thus, for example, in accordance with certain aspects of the present invention, a verification process is provided for use with one or more device parameter controlling functions. When an application or other software program attempts to modify a controlled parameter associated with the device, the device parameter controlling function accesses the services of the verification process to determine if the requesting application is authorized to make the requested change.

The verification process utilizes information received from, or otherwise made available by, the requesting application. For example, the information can include a security code (or a pointer to a security code) or like information that identifies the application in some manner. For example, the security code may be associated with a software provider.

The verification process analyzes this security code to determine if it is valid. For example, a software developer entity can provide both the application and the verification process software with a secret, perhaps encrypted, security code. The verification process can then compare the received/decrypted security code with an existing/decrypted security code to determine if the requesting application was intended by the software developer entity to change the controlled parameter as requested.

The device parameter controlling function can also be configured to allow other authorized and/or unauthorized applications to change the controlled parameter within certain defined limitations as previously set, for example, by an authorized/trusted application. Thus, a range of acceptable values can be established by a trusted application and/or upon system initialization.

If a requesting application seeks to change the controlled parameter beyond the range of acceptable values, then the device parameter controlling function can utilize the services of the verification process to determine if the requesting application is so authorized to change or reset the range. If the requesting application is not so authorized, then the device parameter controlling function can only change the current setting of the controlled parameter to the next closest value as defined within the limitations of the range.

Several verification processes can be employed, for example, in a series, to determine if the security code matches various security codes associated with different authorized applications.

Security can be enhanced by configuring the device parameter controlling function to determine when the verification process has been tampered with. For example, the device parameter controlling function can be configured to determine that the verification process accessed is associated with a predefined memory location within the computer system. Thus, a verification process may be considered to be trusted so long as it remains associated with a memory address located in a read only portion of the memory.

These and other aspects of the present invention are applicable to different combinations of software and/or hardware, and can be used to limit access to a variety of computer controlled devices and/or functions.

DETAILED DESCRIPTION

Figure 1:
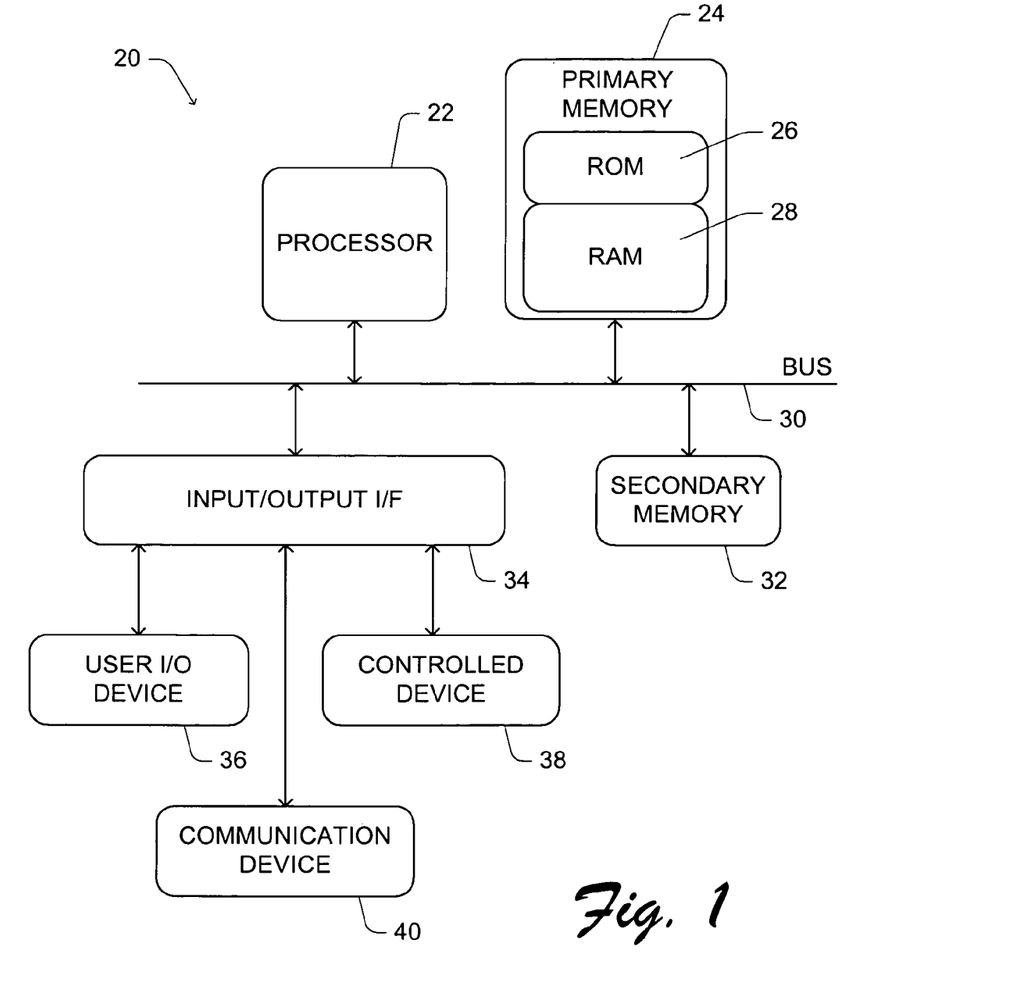
FIG. 1 is a block diagram depicting an exemplary computer system suitable for use with the present invention.

FIG. 1 is a block diagram depicting an exemplary computer system 20 that is suitable for use with the present invention. Computer system 20 includes at least one processor 22 that is operatively coupled to a primary memory 24. In this example, primary memory 24 includes a read only memory (ROM) portion 26 and a random access memory (RAM) portion 28. Data and programmed instructions are stored in primary memory, and used/implemented by processor 22 during operation.

In this example, processor 22 is coupled to primary memory 24 through a bus 30. Bus 30 is, therefore configured to interface processor 22 and primary memory 24 and carry data and control signals there between. As shown, processor 22 is also coupled to a secondary memory 32 through bus 30. Secondary memory 32 can include additional solid-state memory, magnetic data storage devices, optical data storage devices, and/or the like. For example, secondary memory 32 can include a drive that provides access to data stored on a hard magnetic disk, a removable magnetic disk, a removable optical disc, a magnetic tape, a flash memory, or the like.

Bus 30 further couples processor 22 to an input/output interface (I/F) 34. Input/output I/F 34 is configured to operatively couple various devices to processor 22 via bus 30. In this example, a user input/output (I/O) device 36, a controlled device 38 and a communication device 40 are each depicted as being coupled to processor 22 by input/output I/F 34 and bus 30.

User I/O device 36 can include a variety of devices related to the user. For example, to provide for user inputs to processor 22, user I/O device 36 may include a manual keyboard/keypad device, a mouse or pointer device, an audio signal receiver device, and/or other like input devices. Similarly, to provide for outputs to the user, user I/O device 36 may include a visual display device, an audio output device, a force feedback device, a printing device, etc.

Controlled device 38 can be any type of device that can be configured to be controlled in some manner by processor 22 through bus 30 and input/output I/F 34. Thus, for example, controlled device 38 can be a peripheral computer device, another computer system and/or software application, an appliance, a machine, or other like arrangement that operatively responds to outputs associated with processor 22. As described in certain exemplary implementations of the present invention that follow, controlled device 38 can include an audio system that operatively responds to volume control outputs generated by processor 22 and provided to controlled device 38 through bus 30 and input/output I/F 34.

Communication device 40 is configured to provide processor 22 with additional data communications capabilities. Thus, for example, communication device 40 may include a network interface device that can be operatively coupled to one or more external computer networks. In this manner, communication device 40 can be configured to provide computer system 20 with access to additional computing resources.

Figure 2:
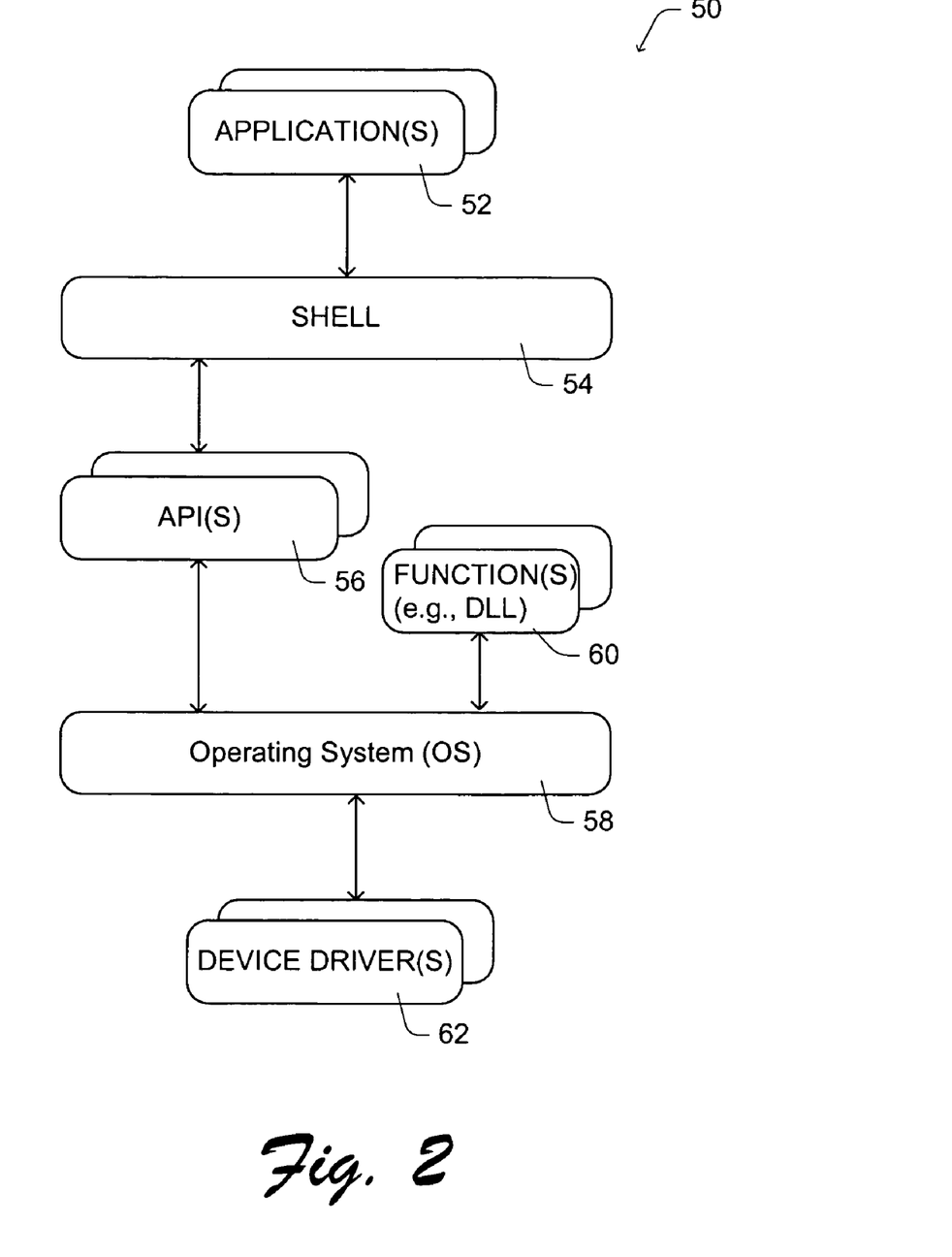
FIG. 2 is a block diagram depicting an exemplary software suite suitable for implementation in the computer system of FIG. 1.

FIG. 2 is a functional block diagram depicting an exemplary software suite 50 suitable for use in the computer system of FIG. 1, and more particularly, for implementation within processor 22. As shown, software suite 50 includes at least one application 52, a shell 54, at least one application programming interface (API) 56, an operating system (OS) kernel 58, at least one function 60 (e.g., a dynamic link library (DLL)) 60, and at least one device driver 62.

For purposes of this detailed description, it is assumed that application 52 is configured to request changes to one or more controlled parameters associated with controlled device 38. For example, application 52 may request that the volume of an audio system (e.g., controlled device 38) be increased/deceased. To accomplish such a request, application 52 will need to utilize shell 54, API 56, OS 58, function 60 to cause a corresponding output to be provided to driver 62. Here, it is assumed that device driver 62 is operatively configured to selectively alter parameters associated with controlled device 38.

As mentioned above, there is often a need to limit access to computer controlled functions and/or devices, such as, controlled device 38. Limiting access requires that only trusted applications be allowed to change the parameters associated with controlled device 38. Thus, in accordance with certain aspects of the present invention, authorization techniques are implemented within software suite 50 to determine if application 52 is trusted and selectively allow application 52 to change the parameters associated with controlled device 38.

Figure 3:
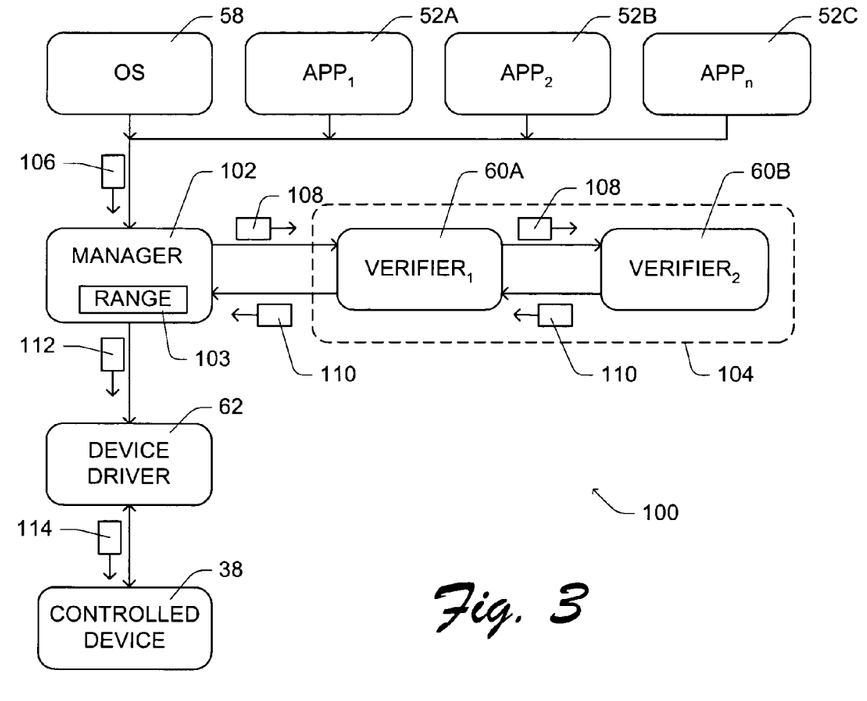
FIG. 3 is a block diagram depicting a functional arrangement of software and hardware that selectively limits access to computer controlled functions and/or devices, in accordance with certain aspects of the present invention.

With this in mind, the block diagram of FIG. 3 depicts a functional 1 arrangement 100 of software and hardware that selectively limits access to computer controlled functions and/or devices, in accordance with certain aspects of the present invention.

As shown in FIG. 3, OS 58 and a plurality of applications 52A through 52C are each configured to provide or otherwise communicate a device parameter change request 106 to a device parameter manager 102. Manager 102 is configured to selectively pass an authorized device parameter adjustment 112 to device driver 62. Device driver 62, upon receipt of an authorized device parameter adjustment 112, outputs or otherwise communicates a corresponding parameter setting 114 to controlled device 38. Consequently, the operation of controlled device 38 is changed in some manner. For example, the volume of an audio system can be increased/deceased as indicated by parameter setting 114.

To determine if the calling OS 58 and/or application 52A–C is trusted, manager 102 is configured to call upon the services of an authenticator 104. Thus, for example, upon receipt of a device parameter change request 106, manager 104 extracts and provides (as necessary) a security code 108 contained therein to authenticator 104. Authenticator 104 examines the security code 108 and returns an authorization indicator 110 that identifies if the requesting OS/application is authorized to make the requested change to the parameter. If the requesting OS/application is authorized to make the requested change to the parameter, then manager 102 passes an authorized device parameter adjustment 112 to device driver 62. Conversely, if the requesting OS/application is not authorized to make the requested change to the parameter, then manager 102 does not pass an authorized device parameter adjustment 112 to device driver 62.

In certain implementations, manager 102 can be configured to pass an authorized device parameter adjustment 112 to device driver 62, without calling authenticator 104 and/or without regard to the authorization indicator 110 received there from. For example, when manager 102 is initialized, a range 103 can be defined for the controlled parameter. Range 103 indicates the acceptable values for the controlled parameter. Thus, for example, a minimum parameter value and/or a maximum parameter value may be defined in range 103. As such, manager 102 can pass an authorized device parameter adjustment 112 to device driver 62, without calling authenticator 104 (and/or without regard to the authorization indicator 110 received there from) when the received device parameter change request 106 does not attempt to exceed the limitations of range 103.

Authenticator 104 includes at least one verifier function that is configured to receive security code 108 and return an authorization indicator 110 based on an analysis of security code 108. In this example, two verifier functions, namely verifier$_1$ 60A and verifier$_2$ 60B are provided within authenticator 104 and arranged in a serial chain-lock manner.

Each verifier function provided within authenticator 104 is preferably configured to determine if the received security code 108 is associated with a known/trusted software developer entity. Thus, for example, a first trusted software developer entity may provide both OS 58 and application (APP$_1$) 52A. The security code associated with a device parameter change request 106 from either OS 58 or APP$_1$ 52A may therefore be the same, or in some manner related.

Figure 5:
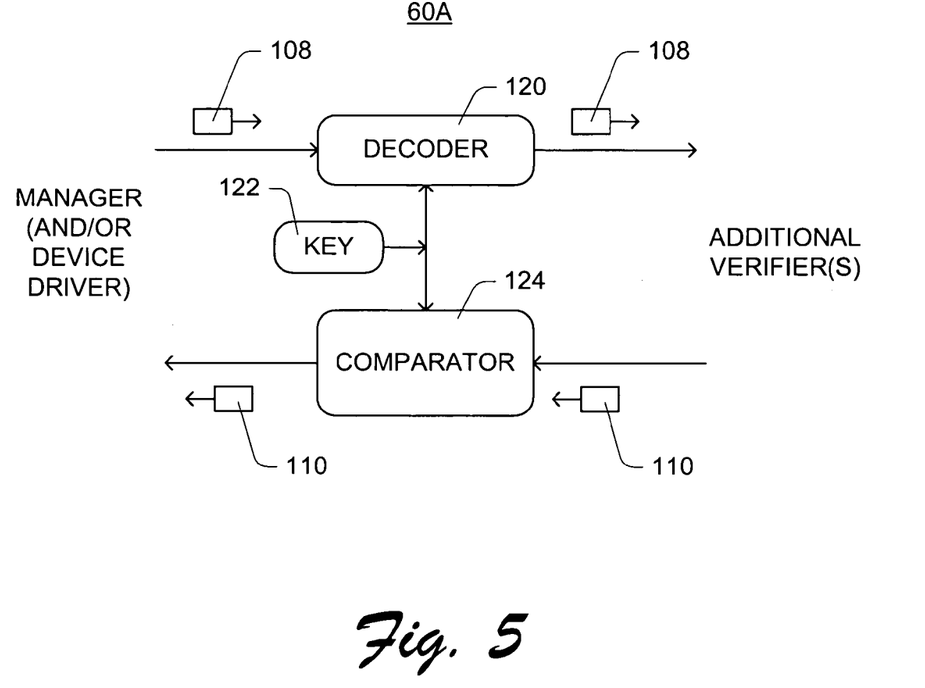
FIG. 5 is a functional block diagram depicting a modular verification process that can be employed to selectively limit access to computer controlled functions and/or devices.

Let us further assume, in this example, that a device parameter change request 106 has been received from APP$_1$ 52A, and that the request exceeds range 103. In this case, manager 102 passes the security code 108 to verifier$_1$ 60A. Verifier$_1$ 60A compares the security code to a known or determined corresponding value as originally provided by the first trusted software developer; if there is a "match", then the authorization indicator 110 will so indicate. An exemplary implementation of verifier$_1$ 60A is depicted in FIG. 5 and described in greater detail below.

Continuing with the example above, let us further assume that verifier$_2$ 60B is provided by a second trusted software developer along with application (APP$_2$) 52B. APP$_2$ 52B will therefore have a different security code than OS 58 and APP$_1$ 52A.

When APP$_2$ 52B outputs a device parameter change request 106 that exceeds range 103, then manager 102 passes the security code 108 to verifier$_1$ 60A. Since the received security code 108 does not result in a match from the function in verifier$_1$ 60A, it is passed on to verifier$_2$ 60B.

Verifier$_2$ 60B compares the received security code 108 to a known or determined corresponding value as originally provided by the second trusted software developer. Since there is a match, the authorization indicator 110 from verifier$_2$ 60B will indicate that the requested parameter change is authorized. Subsequently, the authorization indicator 110 from verifier$_2$ 60B is passed through verifier$_1$ 60A to manager 102.

Now, let us assume that application APP$_n$ 52C is not provided by either the first or second trusted software developer. If APP$_n$ 52C outputs a device parameter change request 106 that exceeds range 103, then manager 102 passes the security code 108 to verifier$_1$ 60A. Here, the security code may be "empty". Since the received security code 108 does not result in a match from the function in verifier$_1$ 60A, it is passed on to verifier$_2$ 60B. The received security code 108 does not result in a match from the function in verifier$_2$ 60B, either. Thus, the authorization indicator 110 from both verifier$_1$ 60A and verifier$_2$ 60B will indicate that the requested parameter change is not authorized.

If the authorization indicator 110 indicates that the requested parameter change is not authorized, then manager 102 can either deny the requested parameter change or can make a partial parameter change based on the requested parameter change and the current applicable limitations defined within range 103.

Thus, for example, consider a computer controlled audio system. If APP$_n$ 52C outputs a volume change request that exceeds a maximum volume as defined within range 103, then manager 102 may increase the current volume setting to be equal to the next closest authorized volume setting, here, the maximum volume as defined within range 103. Since APP$_n$ 52C is not authorized to exceed or otherwise change the defined maximum volume within range 103, manager 102 is so limited.

To the contrary, being so authorized, should either OS 58, APP$_1$ 52A and/or APP$_2$ 52B output a volume change request that exceeds a maximum volume as defined within range 103, then manager 102 will increase the current volume setting as requested and change the maximum volume defined within range 103, accordingly.

In this manner, range 103, and consequently the controlled device parameter, is established and changed by trusted software developer entities. Unauthorized requests to exceed the limitations defined by range 103 are denied.

Figure 4:
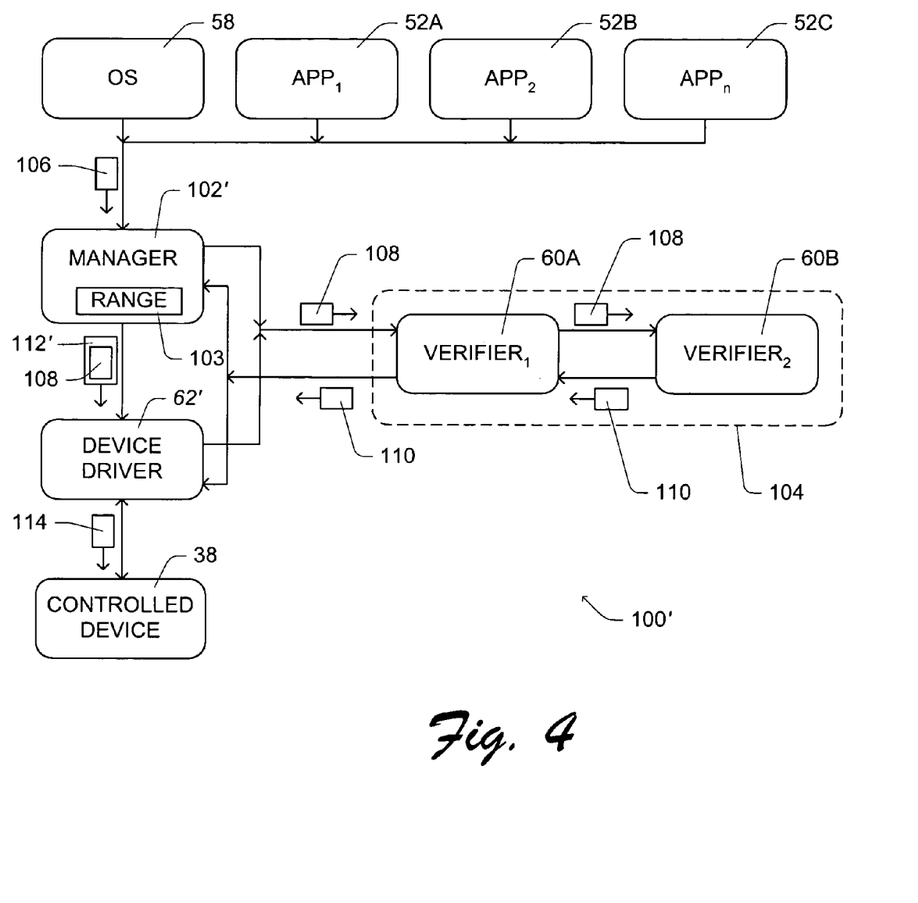
FIG. 4 is a block diagram depicting a functional arrangement of software and hardware that selectively limits access to computer controlled functions and/or devices, in accordance with certain further aspects of the present invention.

FIG. 4, which is similar to FIG. 3, depicts a functional arrangement 100' of software and hardware that selectively limits access to computer controlled functions and/or devices, in accordance with certain further aspects of the present invention. Here, as shown, authenticator 104 can be selectively accessed by either manager 102' and/or device driver 62'. Manager 102' is the same as manager 102, except that manager 102' provides an enhanced authorized device parameter adjustment 112' to device driver 62'. Enhanced authorized device parameter adjustment 112' includes security code 108.

This provides for increased security because device driver 62' can call or otherwise invoke the services of the authenticator 104 using the security code 108, and in doing so, determine that the verifying function(s) within authenticator 104 have not been disabled, replaced, and/or otherwise altered.

For example, verifier$_1$ 60A and verifier$_2$ 60B can be included in ROM 26 (see FIG. 1) as part of a DLL. Device driver 62' can be configured to determine that the called verification function is within the address range of ROM 26. Therefore, if device driver 62' calls verifier$_1$ 60A and determines that the address associated therewith is not an acceptable ROM address, then the authenticator 104 is not to be trusted. In which case, device driver 62' can disregard the enhanced authorized device parameter adjustment 112' entirely, and/or notify other programs or the user about the potential integrity problem.

FIG. 5 is a functional block diagram depicting an exemplary verifier 60A. As shown, verifier 60A includes a decoder 120, a key 122 and a comparator 124. Decoder 120 receives security code 108 and if necessary decodes security code 108. For example, security code 108 can include encrypted data. Decoder 120 decrypts the data in security code 108, for example, using conventional cryptography techniques and data within key 122. All or part of the data in key 122 can also be encrypted. Decoded data from decoder 120 is then provided to comparator 124. Comparator 124 is configured to determine if the decoded data matches known or determined data, for example, within key 122, and output authorization indicator 110. Here, authorization indicator 110 indicates true or false, for example.

In accordance with certain aspects of the present invention, the first trusted software developer is the developer of OS 58. For example, Microsoft Corporation located in Redmond, Wash., produces operating systems for use with personal computers (PCs), servers, handheld computing devices, etc. Accordingly, Microsoft can provide OS 58, $APP_1$ 52A, manager 102 (or 102') and $verifier_1$ 60A to an original equipment manufacture (OEM) for use in a particular computer system. By way of example, as is described in more detail below, an automobile or other like vehicle can include a computer system that controls several devices/subsystems associated with the vehicle. An OEM would manufacture the computer system and load or otherwise provide OS 58, $APP_1$ 52A, manager 102 (or 102') and $verifier_1$ 60A into primary memory 24 and/or secondary memory 32. The OEM would also provide $APP_2$ 52B, $verifier_2$ 60B and device driver 62 (or 62') within primary memory 24 and/or secondary memory 32. Preferably, the OEM stores $verifier_1$ 60A and $verifier_2$ 60B in ROM 26 for added security as described herein. Moreover, this type of modular configuration allows Microsoft and the OEM to each establish and maintain separate and secret security codes for their respective software products.

Figure 6:
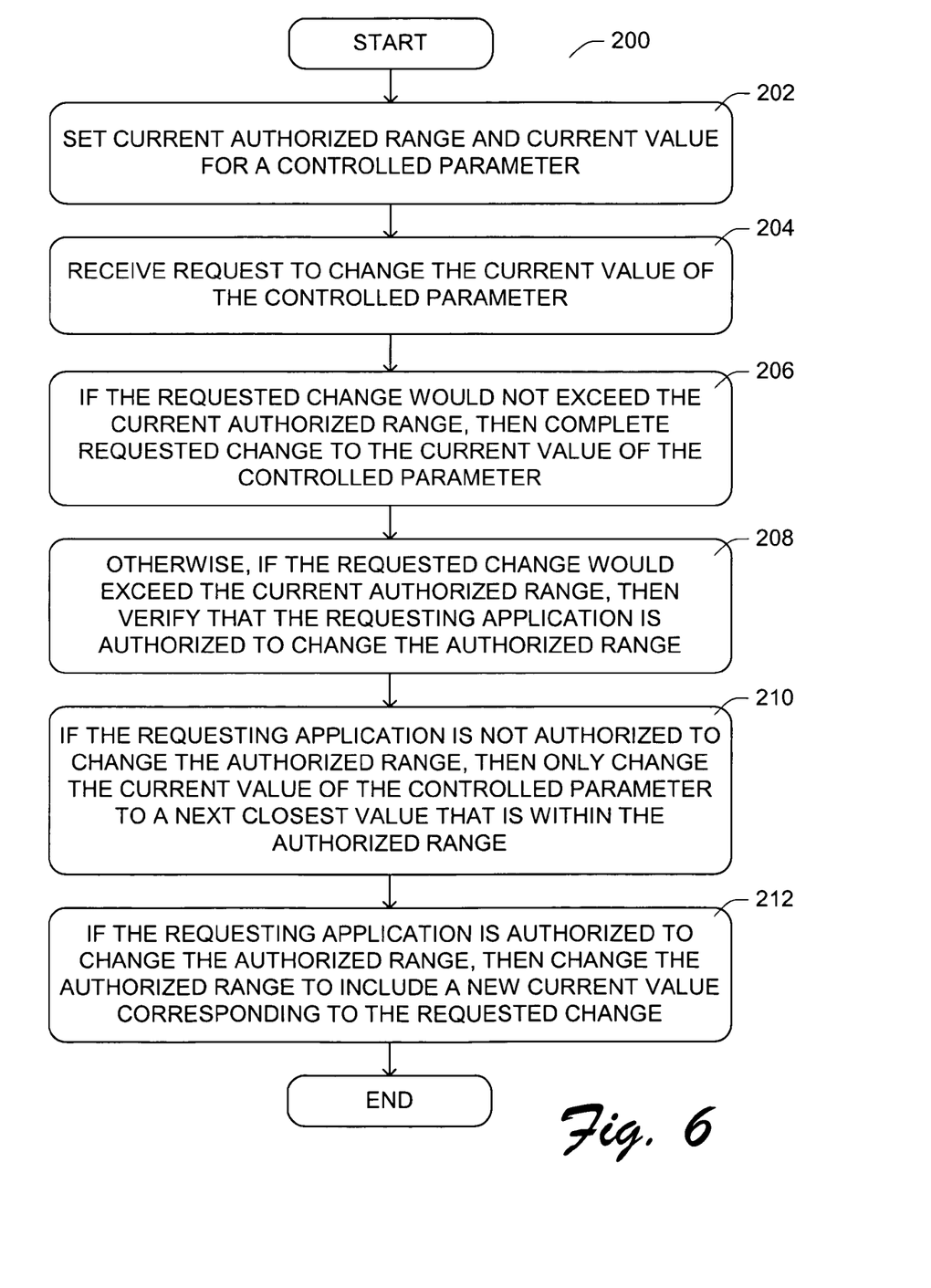
FIG. 6 is a flow-chart depicting a process, suitable for use in the computer system of FIG. 1, for example, that selectively limits access to computer controlled functions and/or devices.

FIG. 6 is a flow-chart depicting a process 200, suitable for use in computer system 20 of FIG. 1, for example, that selectively limits access to computer controlled functions and/or devices. In step 202, a current authorized range 103 (e.g., see FIG. 3) is defined along with a current value for a controlled parameter. For example, in a computer controlled audio system, a volume range of 15 (minimum) through 65 (maximum) (e.g., on a scale of 0 (lowest volume setting) to 100 (highest volume setting)) may be set along with a current volume level of 25.

In step 204, a device parameter change request 106 is received. For example, a request to change the current volume from 25 to 45 (i.e., an increase of 20) may be received from an application.

Next, in step 206, if the device parameter change request 106 would not require exceeding range 103, then the requested change is completed. Thus, for example, a request to change the volume to 45 would be completed since 45 falls within the range of 15 to 65.

As shown in step 208, if the device parameter change request 106 would require exceeding range 103, then a determination is made as to whether the requesting application is authorized to change the limitations in range 103. By way of example, in the preceding audio system example, if the requested volume change would result in a volume setting of 75, then step 208 would determine if the requesting application is authorized to change the volume range to 15 (minimum) through 75 (maximum).

According to step 210, if the requesting application is determined by step 208 to be unauthorized to change range 103, then the current value of the parameter is limited by range 103, and the current value of the parameter is set to the next closest value within range 103. Thus, for example, if the requesting application is unauthorized to change the volume range to include a (maximum) volume of 75, then the current volume setting will equal the next closest value in the range, which would be the maximum currently approved volume level of 65. The authorized volume range would remain 15 (minimum) through 65 (maximum).

According to step 212, if the requesting application as determined by step 208 to authorized to change range 103, then the current value of the parameter is changed as requested and the range 103 is changed to include this new value. Thus, for example, if the requesting application is authorized to change the volume range to include a (maximum) volume of 75, then the current volume setting will set at 75 and the authorized volume range thereafter will be 15 (minimum) through 75 (maximum).

Figure 7:
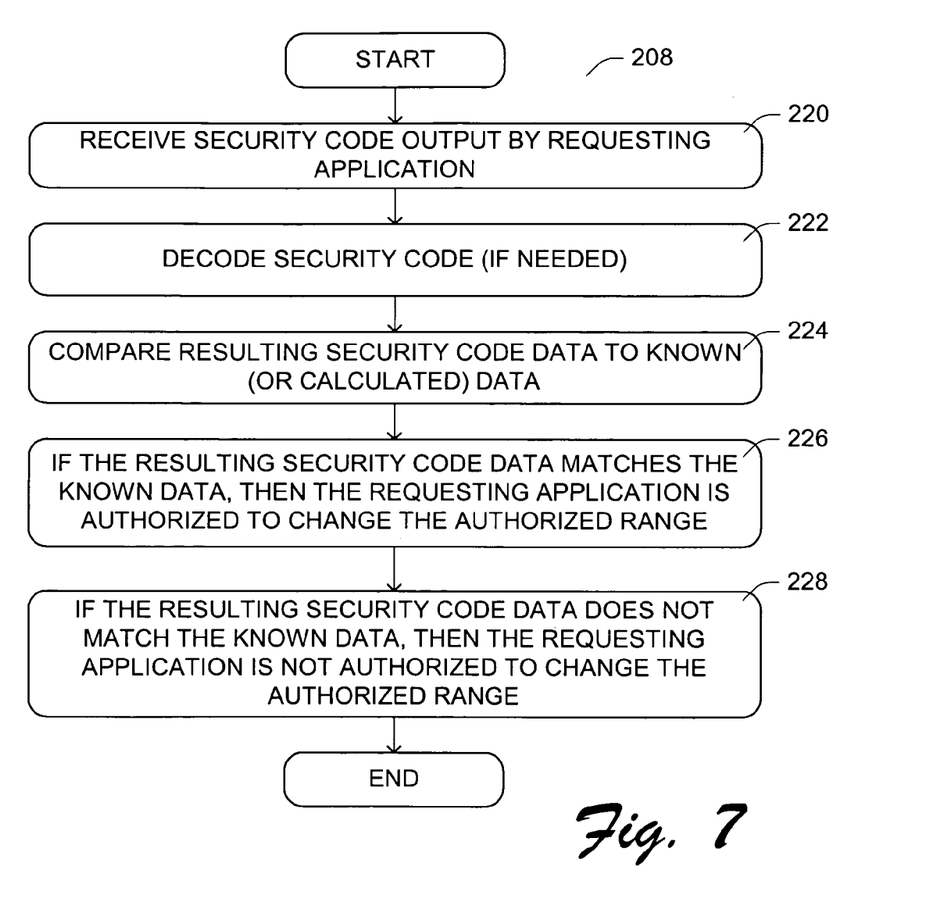
FIG. 7 is a flow-chart depicting a verification process that can be employed to selectively limit access to computer controlled functions and/or devices.

With process 200 in mind, FIG. 7 is an example of a flow-chart depicting a verification process in accordance with step 208 above. In step 220, a security code 108 is received from the requesting application. In step 222, if necessary, the security code is decoded, for example, using conventional decryption techniques. Next, in step 224, the resulting security code data from step 222 is compared to known or otherwise calculated data. If the resulting security code data "matches" the known or otherwise calculated data, then according to step 226 the requesting application is authorized to change range 103. To the contrary, if the resulting security code data fails to "match" the known or otherwise calculated data, then according to step 228 the requesting application is not authorized to change range 103.

Figure 8:
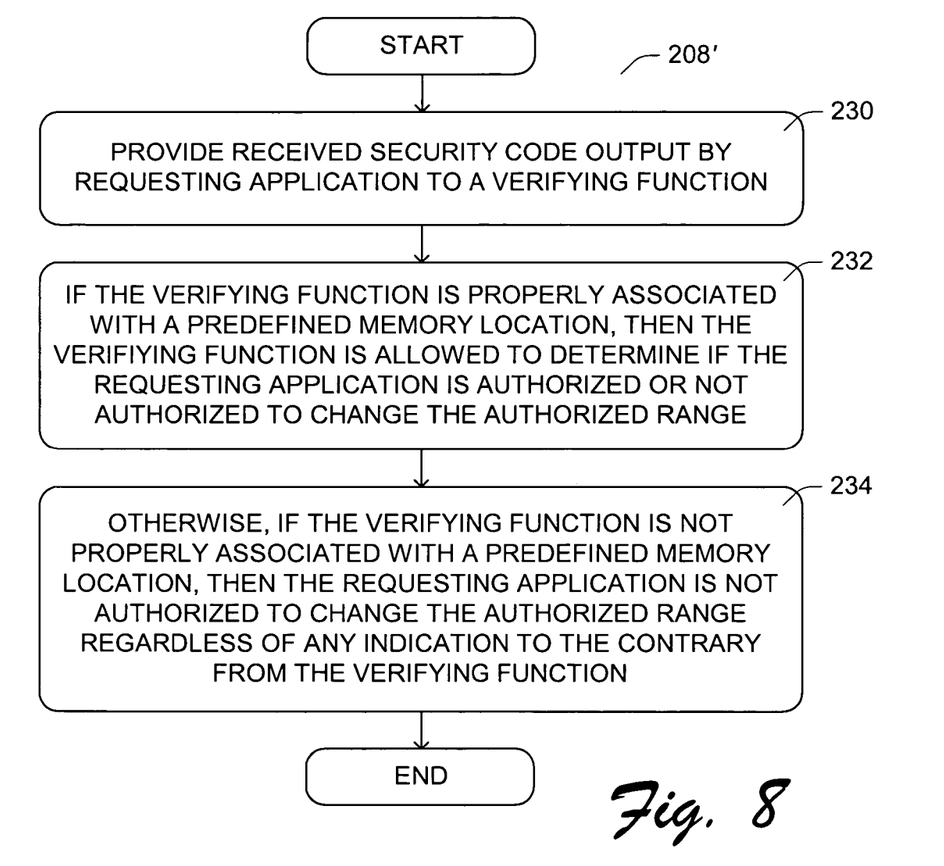
FIG. 8 is a flow-chart depicting an enhanced verification process that can be employed to selectively limit access to computer controlled functions and/or devices.

In accordance with certain further aspects of the present invention, certain enhanced security features can be included within a verification process step 208', as depicted in FIG. 8. In step 230, a received security code is provided to a verifying function. According to step 232, if the verifying function is determined to be properly associated with a predefined or otherwise expected memory location (e.g., address), then the verifying function is allowed to determine if the requesting application is authorized to change range 103. To the contrary, according to step 234, if the verifying function is determined to be improperly associated with a predefined or otherwise expected memory location, then the requesting application is deemed unauthorized to change range 103, regardless of any decision made by the verifying function.

Figure 9:
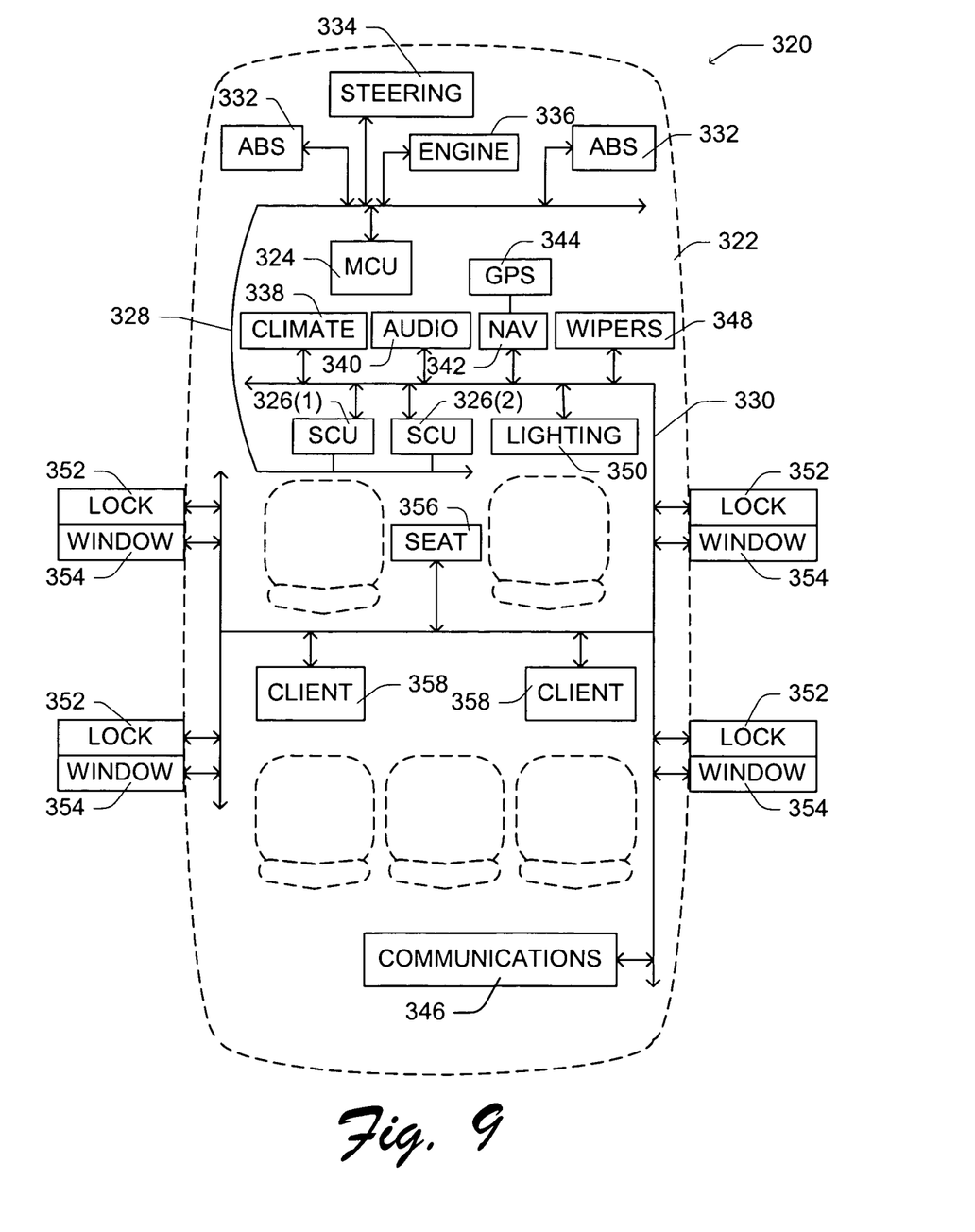
FIG. 9 is a block diagram of an exemplary computer system that is arranged within a vehicle to monitor and control various features/devices therein and to selectively limit access to certain computer controlled functions and/or devices.

FIG. 9 is a block diagram of an exemplary computer system 320 that is arranged within a vehicle 322 to monitor and control various features/devices therein and to selectively limit access to certain computer controlled functions and/or devices.

As shown, computer system 320 has a plurality of processors, including a master control unit (MCU) 324 and one or more secondary control unit (SCU) 326(1) and 326(2). A dual bus structure having a primary data communications bus 328 and a secondary support bus 330 provide an infrastructure for data communications in the computer system 320. The primary bus 328 may be implemented using any vehicle bus design currently employed or contemplated by automobile manufactures, such as CAN, ABUS, VAN, J1850, K-BUS, P-BUS, I-BUS, USB, P1394, and so forth. The master control unit 324 can be configured as master of the primary bus 328. The support bus 330 may be implemented as any standard computer data bus, such as PCI, USB, P1394, and the like. One or both secondary control units 326(1) and 326(2) can be configured as master of the support bus 330 and as controller of one or more components coupled to the support bus 330.

The master control unit 324 and the secondary control unit(s) 326 are interconnected through the primary vehicle bus 328. In addition, various electronic automobile components are connected to the master control unit 324 via the primary bus 328. In this illustration, the electronic components include an antilock braking system (ABS) 332, an electronic steering system 334, and an engine control system 336. However, other components may likewise be connected to the primary vehicle bus 328, such as a security/alarm system, a diagnostic system, a lighting control system, a fuel injection system, an automatic transmission system, and so forth.

In addition, the electronic components shown in FIG. 9 are intelligent components in that they each have their own local controller, typically embodied as a microprocessor. The automobile might further include non-intelligent electronic components that do not have local processing capabilities.

FIG. 9 shows a number of controlled devices connected to the support bus 330. These controlled devices include a climate control system 338, an audio system 340, a navigation system 342 with global positioning system (GPS) antenna 344, and a cellular communications system 346. The support bus 330 is also coupled to a wipers module 348, lighting control 350, power door locks 352, power window controls 354, and seat control 356. An SCU 326 may also be configured as a server to serve to multiple clients 358. The clients 358 can be implemented, for example, as small hand held or laptop game computers having visual display screens and audio sound cards to provide multimedia entertainment. Thus, SCU 326 can serve in-car entertainment in the form of movies and games to the clients 358 for the passengers' enjoyment.

The control units 324 and 326 can be arranged in two different architectures: (1) master/slave architecture; and (2) cluster architecture. In a master/slave architecture, the master control unit 324 acts as the master of the primary vehicle bus 328 and all electronic components 332–336, as well as the secondary control unit(s) 326, act as slaves to master control unit 324. The master control unit 324 manages data flow among the electronic components 332-336 and facilitates resource and information sharing. In addition, the master control unit 324 provides backup for the intelligent electronic components in the event that any of them fail, and also performs data processing and control functions for non-intelligent electronic components.

In this example, if an application running on MCU 324 and/or a SCU 326 request a volume change in audio system 340, then a manager 102 program running, for example, on MCU 324, would be called. Manager 102 would then selectively access the services of authenticator 104 to determine if the calling application is authorized to change the current volume setting in accordance with the various techniques and examples presented herein. In this manner, a variety of computer controlled parameters can be safeguarded against unauthorized changes.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:

verifying that a first application is authorized to set an initial range for a controlled parameter setting;

if authorized, allowing the first application to set an initial range for the controlled parameter setting;

subsequently, allowing at least a second application to modify the controlled parameter setting within the initial range set by the first application;

verifying that the second application is authorized to modify a current range for the controlled parameter setting;

if authorized allowing the second application to modify the current range for the controlled parameter setting; and subsequently, allowing at least a third application to modify the controlled parameter setting within the current range as modified by the second application, wherein verifying that the first application is authorized to set the initial range for the controlled parameter setting further includes using a first verifier; and verifying that the second application is authorized to modify the current range for the controlled parameter setting further includes using a second verifier, wherein the first verifier and the second verifier are operatively configured in a serial arrangement, and the first verifier is independently responsive to a first security code and the second verifier is independently responsive to a second security code.

2. A method as recited in claim 1 wherein the first and second security codes are at least partially encrypted.

3. A method as recited in claim 1 wherein the first and second applications are verified based at least partially on memory location information associated with a verifying function.

4. A method as recited in claim 3, wherein the memory location information associated with the verifying function defines memory location within a read only memory (ROM).

5. A method as recited in claim 1 wherein the initial range includes at least a maximum controlled parameter setting, and the second application is not allowed to modify the controlled parameter setting beyond the maximum controlled parameter setting.

6. A method as recited in claim 1 wherein the initial range includes at least a minimum controlled parameter setting, and the second application is not allowed to modify the controlled parameter setting below the minimum controlled parameter setting.

7. A method as recited in claim 1 wherein the controlled parameter setting is selected from a group of settings comprising an audio volume control parameter, an audio tone control parameter, an illumination control parameter, a visual display control parameter, a temperature control parameter, a communication access control parameter, a peripheral device control parameter, a vehicle control parameter, and an environment control parameter.

8. A method as recited in claim 1 wherein the first verifier is provided by a first entity and the second verifier that is provided by a second entity.

9. A method as recited in claim 1 wherein the first security code and the second security code are the same.

10. A method as recited in claim 1 wherein the first security code is provided by a first entity and the second security code is provided by a second entity.

11. A computer-readable medium having computer-executable instructions for performing steps comprising:
   verifying that a first application is authorized to set an initial range for a controlled parameter setting;
   if authorized, allowing the first application to set an initial range for the controlled parameter setting;
   subsequently, allowing at least a second application to modify the controlled parameter setting within the initial range set by the first application;
   verifying that the second application is authorized to modify a current range for the con trolled parameter setting;
   if authorized, allowing the second application to modify the current range for the controlled parameter setting; and
   subsequently, allowing at least a third application to modify the controlled parameter setting within the current range as modified by the second application;
   wherein
   verifying that the first application is authorized to set the initial range for the controlled parameter setting further includes using a first verifier; and
   verifying that the second application is authorized to modify the current range for the controlled parameter setting further includes using a second verifier,
   wherein the first verifier and the second verifier are operatively configured in a serial arrangement, and the first verifier is independently responsive to a first security code and the second verifier is independently responsive to a second security code.

12. A computer-readable medium as recited in claim 11 wherein the first and second security codes are at least partially encrypted.

13. A computer-readable medium as recited in claim 11 wherein the first and second applications are verified based at least partially on memory location information associated with a verifying function.

14. A computer-readable medium as recited in claim 13 wherein the memory location information associated with the verifying function defines memory location within a read only memory (ROM).

15. A computer-readable medium as recited in claim 11 wherein the initial range includes at least a maximum controlled parameter setting, and the second application is not allowed to modify the controlled parameter setting beyond the maximum controlled parameter setting.

16. A computer-readable medium as recited in claim 11 wherein the initial range includes at least a minimum controlled parameter setting, and the second application is not allowed to modify the controlled parameter setting below the minimum controlled parameter setting.

17. A computer-readable medium as recited in claim 11 wherein the controlled parameter setting is selected from a group of settings comprising an audio volume control parameter, an audio tone control parameter, an illumination control parameter, a visual display control parameter, a temperature control parameter, a communication access control parameter, a peripheral device control parameter, a vehicle control parameter, and an environment control parameter.

18. A computer-readable medium as recited in claim 11 wherein the first verifier is provided by a first entity and the second verifier that is provided by a second entity.

19. A computer-readable medium as recited in claim 11 wherein the first security code and the second security code are the same.

20. A computer-readable medium as recited in claim 11 wherein the first security code is provided by a first entity and the second security code is provided by a second entity.

* * * * *

UNITED STATES PATENT AND TRADEMARK OFFICE
CERTIFICATE OF CORRECTION

| | |
|---|---|
| PATENT NO. | : 6,971,015 B1 |
| APPLICATION NO. | : 09/538621 |
| DATED | : November 29, 2005 |
| INVENTOR(S) | : Falcon et al. |

It is certified that error appears in the above-identified patent and that said Letters Patent is hereby corrected as shown below:

On the title page, item (57), in "Abstract", in column 1, line 1, after "provided" insert -- to --.

In the drawings:
On Sheet 8 of 9, in Box 232 (Fig. 8), line 3, delete "VERIFIYING" and insert -- VERIFYING --, therefor.

In column 1, line 38, after "arise" delete "it" and insert -- if --, therefor.

In column 4, line 44, after "functional" delete "1".

In column 10, line 10, in Claim 1, after "authorized" insert -- , --.

In column 10, line 30, in Claim 2, after "claim 1" insert -- , --.

In column 10, line 32, in Claim 3, after "claim 1" insert -- , --.

In column 10, line 41, in Claim 5, after "claim 1" insert -- , --.

In column 10, line 46, in Claim 6, after "claim 1" insert -- , --.

In column 10, line 51, in Claim 7, after "claim 1" insert -- , --.

In column 10, line 60, in Claim 8, after "claim 1" insert -- , --.

In column 10, line 63, in Claim 9, after "claim 1" insert -- , --.

In column 10, line 65, in Claim 10, after "claim 1" insert -- , --.

In column 11, line 11, in Claim 11, delete "con trolled" and insert -- controlled --, therefor.

In column 11, line 18, in Claim 11, after "application" delete ";" and insert -- , --, therefor.

In column 11, line 31, in Claim 12, after "claim 11" insert -- , --.

In column 11, line 34, in Claim 13, after "claim 11" insert -- , --.

UNITED STATES PATENT AND TRADEMARK OFFICE
CERTIFICATE OF CORRECTION

PATENT NO. : 6,971,015 B1
APPLICATION NO. : 09/538621
DATED : November 29, 2005
INVENTOR(S) : Falcon et al.

It is certified that error appears in the above-identified patent and that said Letters Patent is hereby corrected as shown below:

In column 12, line 1, in Claim 14, after "claim 13" insert -- , --.

In column 12, line 5, in Claim 15, after "claim 11" insert -- , --.

In column 12, line 11, in Claim 16, after "claim 11" insert -- , --.

In column 12, line 16, in Claim 17, after "claim 11" insert -- , --.

In column 12, line 26, in Claim 18, after "claim 11" insert -- , --.

In column 12, line 29, in Claim 19, after "claim 11" insert -- , --.

In column 12, line 32, in Claim 20, after "claim 11" insert -- , --.

Signed and Sealed this

Third Day of November, 2009

David J. Kappos
*Director of the United States Patent and Trademark Office*